United States Patent
Elliot et al.

(10) Patent No.: US 10,713,014 B2
(45) Date of Patent: *Jul. 14, 2020

(54) MULTI-PLATFORM INTERFACE FRAMEWORK

(71) Applicant: Palantir Technologies Inc., Palo Alto, CA (US)

(72) Inventors: Mark Elliot, London (GB); Punyashloka Biswal, Norwalk, CT (US); Robert Fink, San Francisco, CA (US); Ryan McNamara, Mountain View, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,122

(22) Filed: Jun. 13, 2019

(65) Prior Publication Data
US 2019/0294418 A1 Sep. 26, 2019

Related U.S. Application Data

(63) Continuation of application No. 15/448,191, filed on Mar. 2, 2017, now Pat. No. 10,365,898.
(Continued)

(51) Int. Cl.
*G06F 8/30* (2018.01)
*G06F 8/65* (2018.01)
*G06F 9/54* (2006.01)

(52) U.S. Cl.
CPC .................. *G06F 8/30* (2013.01); *G06F 8/65* (2013.01); *G06F 9/547* (2013.01)

(58) Field of Classification Search
CPC .................................. G06F 8/30; G06F 9/547
(Continued)

(56) References Cited

U.S. PATENT DOCUMENTS

| 7,555,757 B2* | 6/2009 | Smith | G06F 9/465 |
| | | | 719/313 |
| 7,827,563 B2* | 11/2010 | Westervelt | H04L 67/02 |
| | | | 719/315 |

(Continued)

OTHER PUBLICATIONS

Francese, Rita, et al. "Supporting the development of multi-platform mobile applications." 2013 15th IEEE International Symposium on Web Systems Evolution (WSE). IEEE, 2013. pp. 87-90 (Year: 2013).*

(Continued)

*Primary Examiner* — Satish Rampuria
(74) *Attorney, Agent, or Firm* — Sheppard Mullin Richter & Hampton LLP

(57) ABSTRACT

Systems and methods are provided for generating one or more interface objects for facilitating remote interaction between one or more client systems and a server system over a communication network, the one or more interface objects generated from a same interface definition object. The one or more interface objects are stored. A service request is received from a particular client system of the one or more client systems over the communication network. A particular interface object is selected from the one or more interface objects based on the service request. The service request is processed using the particular interface object.

17 Claims, 7 Drawing Sheets

Related U.S. Application Data

(60) Provisional application No. 62/422,369, filed on Nov. 15, 2016.

(58) Field of Classification Search
USPC .................................................. 717/106–119
See application file for complete search history.

(56) References Cited

U.S. PATENT DOCUMENTS

| | | | | |
|---|---|---|---|---|
| 2008/0120129 A1* | 5/2008 | Seubert | ................. | G06Q 10/06 |
| | | | | 705/35 |
| 2009/0119578 A1* | 5/2009 | Relyea | .................... | G06F 9/451 |
| | | | | 715/234 |
| 2010/0268690 A1* | 10/2010 | Anderson | .............. | G06Q 20/00 |
| | | | | 707/661 |

OTHER PUBLICATIONS

Ali, Mir Farooq, et al. "Building multi-platform user interfaces with UIML." Computer-Aided Design of User Interfaces III. Springer, Dordrecht, 2002. pp. 255-266. (Year: 2002).*

Corral, Luis, Alberto Sillitti, and Giancarlo Succi. "Mobile multiplatform development: An experiment for performance analysis." Procedia Computer Science 10 (2012): pp. 736-743. (Year: 2012).*

* cited by examiner

MULTI-PLATFORM INTERFACE FRAMEWORK

CROSS REFERENCE TO RELATED APPLICATIONS

This application is a continuation of U.S. Ser. No. 15/448,191, filed Mar. 2, 2017, which claims the benefit under 35 U.S.C. § 119(e) of U.S. Provisional Application Ser. No. 62/422,369 filed Nov. 15, 2016, the content of which is incorporated by reference in its entirety into the present disclosure.

BACKGROUND

Technical Field

This disclosure relates to approaches for creating application programming interfaces (APIs) and other related interfaces.

Description of Related Art

Under conventional approaches, clients often require an interface (e.g., an API) to interact with a server. In a typical example, interfaces are manually programmed by a developer based on server implementation details and client implementation details. In such an example, developers are required to have access to, and knowledge of, server implementation details and client implementation details, and individually program a different interface for each of the client implementations.

SUMMARY

A claimed solution rooted in computer technology overcomes problems specifically arising in the realm of computer technology. In various embodiments, a computing system is configured to automatically generate application interface objects (e.g., APIs) and/or intermediate interface objects (e.g., libraries for instantiating application interface objects) that allow client systems to interact with server systems. Either or both of the application interface objects and the intermediate interface objects can be generically referred to as interface objects. Interface objects can each be generated by the computing system from the same interface definition object. For example, a Java API and a Python API can each be generated from the same interface definition object. In some embodiments, the computing system is capable of generating different interface objects for the same language. For example, different Java APIs can be generated for the Java language from the same interface definition object (e.g., depending on client system requirements). This may help ensure that interface objects are mutually consistent across different languages and variants.

In some embodiments, the computing system generates multiple interface objects from the same interface definition object in response to one or more trigger events. For example, if an interface definition object is modified (e.g., updated to a new version), the computing system can generate corresponding interface objects from the modified interface definition object. Similarly, if support for a new programming language is provided, the computing system can automatically generate interface objects from the interface definition object for those new languages. In some embodiments, the computing system is configured to store the interface objects and the interface definition objects in a searchable format (e.g., an index).

Various embodiments of the present disclosure include systems, methods, and non-transitory computer readable media configured to generate one or more interface objects for facilitating remote interaction between one or more client systems and a server system over a communication network, the one or more interface objects generated from a same interface definition object. The one or more interface objects are stored. A service request is received from a particular client system of the one or more client systems over the communication network. A particular interface object is selected from the one or more interface objects based on the service request. The service request is processed using the particular interface object.

In some embodiments, the one or more interface objects comprise one or more application programming interfaces (APIs).

In some embodiments, the systems, methods, and non-transitory computer readable media are configured to determine a format of the service request, and the selecting the particular interface object from the one or more interface objects based on the service request comprises selecting the particular interface object from the one or more interface objects based on the format of the service request.

In some embodiments, the format indicates a programming language, an operating system, and an interface object version. In related embodiments, the selecting the particular client interface object from the one or more client interface objects based on the service request comprises selecting the particular client interface object matching the programming language, the operating system, and the interface object version information indicated by the format of the service request.

In some embodiments, the systems, methods, and non-transitory computer readable media are configured to trigger generation of one or more second interface objects in response to a trigger event, the one or more second interface objects comprising one or more client interface objects, store the one or more second interface objects, identify one or more second client systems of the one or more client systems associated with at least one of the one or more interface objects, and notify the one or more second client systems regarding the one or more second interface objects. In related embodiments, the trigger event comprises receiving a second interface definition object, the second interface definition object being an updated version of the interface definition object.

In some embodiments, the systems, methods, and non-transitory computer readable media are configured to trigger generation of one or more second client interface content objects in response to a trigger event without requiring user input, store the one or more second client interface objects, receive a second service request from a second client system of the one or more client systems over the communication network, select a second particular client interface object from the one or more client interface objects and the one or more second client interface objects based on the second service request, and process the second service request using the second particular client interface object. In related embodiments, the trigger event comprises receiving a second interface definition object, the second interface definition object being a different version of the interface definition object. In further related embodiments, the systems, methods, and non-transitory computer readable media are configured to publish at least one of the one or more second interface objects to at least one of the one or more second client systems in response to the trigger event.

In some embodiments, the systems, methods, and non-transitory computer readable media are configured to trigger generation of one or more second interface objects in response to a trigger event, the one or more second interface objects comprising one or more server interface objects, store the one or more second interface objects, receive a second service request from a second client system of the one or more client systems over the communication network, selected a second particular interface object from the one or more second interface objects and at least a portion of the one or more interface objects, the selecting based on the second service request, and process the second service request using the second particular interface object. In related embodiments, the trigger event comprises receiving a second interface definition object, the second interface definition object being a different version of the interface definition object.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Under conventional approaches, clients often require an interface (e.g., an API) to interact with a server. In a typical example, interfaces are manually programmed by a developer based on server implementation details and client implementation details. In such an example, developers are required to have access to, and knowledge of, server implementation details and client implementation details, and individually program a different interface for each of the client implementations.

A claimed solution rooted in computer technology overcomes problems specifically arising in the realm of computer technology. In various embodiments, a computing system is configured to automatically generate application interface objects (e.g., APIs) and/or intermediate interface objects (e.g., libraries for instantiating application interface objects) that allow client systems to interact with server systems. Either or both of the application interface objects and the intermediate interface objects can be generically referred to as interface objects. Interface objects can each be generated by the computing system from the same interface definition object. For example, a Java API and a Python API can each be generated from the same interface definition object. In some embodiments, the computing system is capable of generating different interface objects for the same language. For example, different Java APIs can be generated for the Java language from the same interface definition object (e.g., depending on client system requirements). This may help ensure that interface objects are mutually consistent across different languages and variants.

In some embodiments, the computing system generates multiple interface objects from the same interface definition object in response to one or more trigger events. For example, if an interface definition object is modified (e.g., updated to a new version), the computing system can generate corresponding interface objects from the modified interface definition object. Similarly, if support for a new programming language is provided, the computing system can automatically generate interface objects from the interface definition object for those new languages. In some embodiments, the computing system is configured to store the interface objects and the interface definition objects in a searchable format (e.g., an index).

Figure 1:
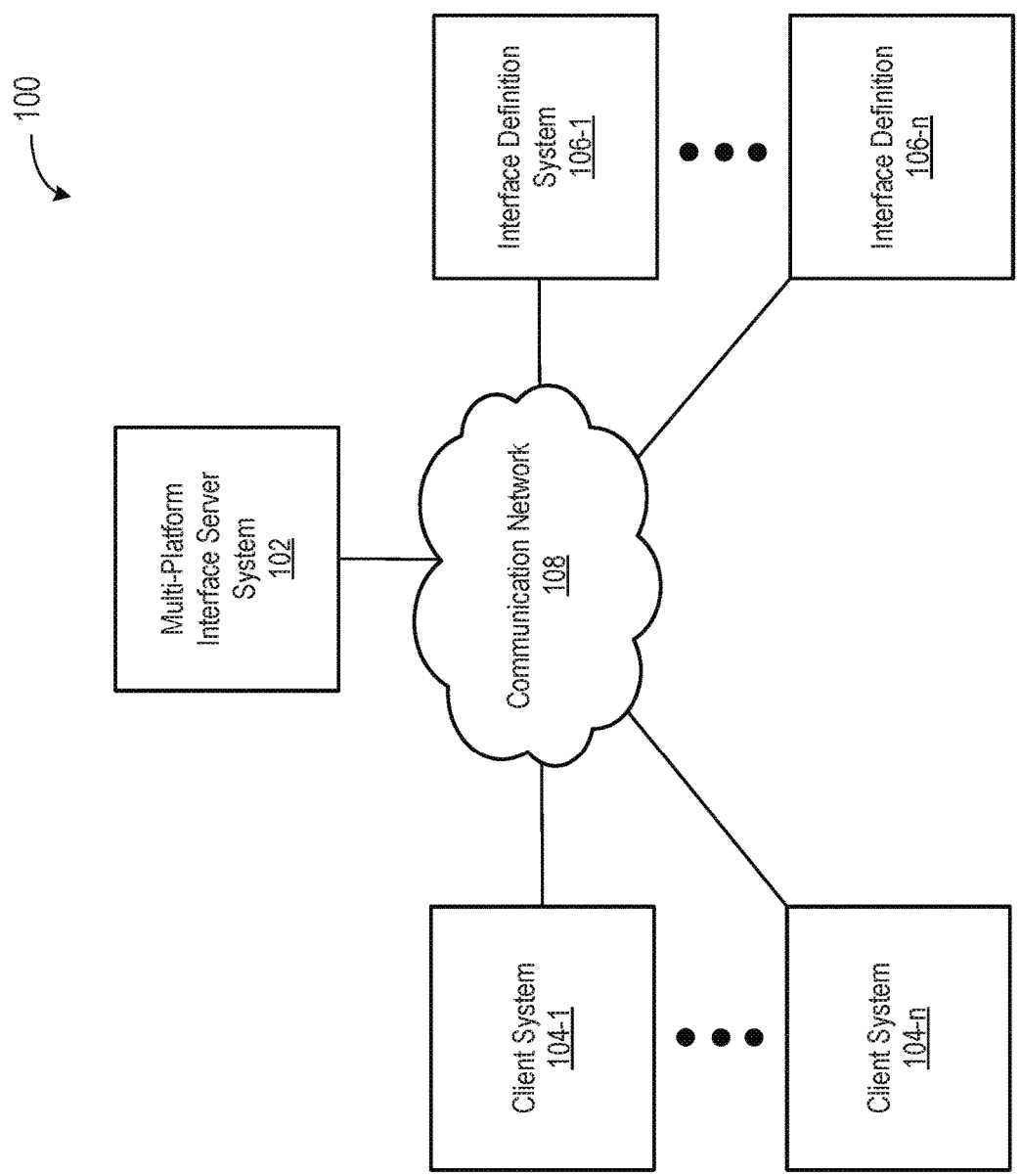
FIG. 1 depicts a diagram of an example of a system for generating interface content objects according to some embodiments.

FIG. 1 depicts a diagram of an example of a system 100 for generating interface objects according to some embodiments. The example system shown in FIG. 1 includes a multi-platform interface server system 102, client systems 104-1 to 104-n (individually, the client system 104, collectively, the client systems 104), interface definition systems 106-1 to 106-n (individually, the interface definition system 106, collectively, the interface definition systems 106), and a communication network 108.

In the example of FIG. 1, the multi-platform interface server system 102 functions to automatically generate interface objects from an interface definition object. For example, some or all of the functionality of the multi-platform interface server system 102 can be performed by one or more local server systems, remote server systems, or centralized server system. As used in this paper, interface objects can include application programming interfaces (APIs), software development kits (SDKs), source code, machine code, or server stubs. Accordingly, objects can include files (e.g., source code files), documents, executables, and the like. Interface definition objects can include interface specifications defined by an object definition language (ODL), an interface definition language (IDL), or other specification language. In some embodiments, the interface definition objects are both machine-readable and human-readable, and facilitate rendering of associated interface documentation.

As used herein, interface objects can refer to client interface objects, server interface objects, or both. In some embodiments, client interface objects are associated with client systems, and facilitate interaction with remote systems. For example, client interface objects can include code (e.g., source code, byte code, or machine code) that allow client systems to communicate with server APIs. Server interface objects can, for example, include server API implementations.

In some embodiments, the multi-platform interface server system 102 functions to generate multiple interface objects from the same interface definition object. For example, the multi-platform interface server system 102 can automatically (e.g., without requiring user input) generate interface objects for different platforms from a single interface definition object. As used in this paper, the term "platform" can include one or more operating systems (e.g., Windows, MacOSi, iOS, or Android) or programming languages (e.g., Java, TypeScript, Python, or C++). Thus, for example, the multi-platform interface server system 102 can automatically generate both a Java interface object and a Python interface object from the same interface definition object, e.g., without requiring a developer to manually code each type of interface object.

In some embodiments, the multi-platform interface server system 102 functions to automatically generate documentation for the interface definition objects, interface objects, or both. For example, the multi-platform interface server system 102 can render interface documentation directly from interface definition objects or interface objects. In some embodiments, the multi-platform interface server system 102 functions to render documentation with sample code extracted from the interface definition objects or interface objects.

In some embodiments, the multi-platform interface server system 102 functions to store interface objects and interface definition objects in a searchable format, such as an index or other suitable structure. For example, the multi-platform interface server system 102 can store the generated objects, as well as version information and other related information. Once the objects are stored (or, "indexed"), they can be easily retrieved either manually, e.g., by a user, or automatically, e.g., by the multi-platform interface server system 102.

In some embodiments, the multi-platform interface server system 102 functions to receive service requests, process service requests, and respond to service requests. For example, the multi-platform interface server system 102 can perform such functionality using appropriate server interface objects selected from the stored server interface objects. In some embodiments, server interface objects are selected based on the service request. For example, a Java server interface object can be selected based on a service request message generated using a corresponding Java client interface object. In some embodiments, the multi-platform interface server system 102 functions to facilitate interoperability between different interface objects associated with the same interface definition object. For example, server interface objects can be selected based on server constraints, independent of client interface objects and client requests (e.g., a Python server interface object can service requests originating from Java client interface objects).

In various embodiments, some of the functionality of the multi-platform interface server system 102 may be performed by one or more other systems (e.g., one or more remote server systems) in communication with the multi-platform interface server system 102. For example, the multi-platform interface server system 102 may provide interface objects to one or more remote server systems to facilitate receiving, processing, and/or responding to service requests by the one or more remote servers.

In some embodiments, the multi-platform interface server system 102 functions to publish interface objects. For example, the multi-platform interface server system 102 can automatically generate and store multiple interface objects associated with an interface definition object when the interface definition is updated, when the multi-platform interface server system 102 is updated, or when support for a new platform is provided. In some embodiments, the multi-platform interface server system 102 can automatically publish interface objects to remote systems (e.g., remote server systems or client systems). For example, the multi-platform interface server system 102 can maintain a directory of remote systems associated with an interface definition object or interface object, and publish the interface objects to some or all of the associated remote systems.

In the example of FIG. 1, the client systems 104 function to consume remote services. For example, the client systems 104 can include applications, processes, services, microservices, and the like. Functionality of the client systems 104 can be performed by one or more workstations, desktop computers, laptop computers, mobile devices (e.g., smartphone, cell phone, smartwatch, tablet computer, etc.), server systems, and the like. In various embodiments, the client systems 104 can be associated with a variety of different platforms (or, "implementations"). In some embodiments, a client system 104 can consume remote services using a client interface object associated with the platform of the client system 104. For example, a Java client system 104 can provide a service request using a Java client interface object.

In the example of FIG. 1, the interface definition systems 106 function to generate interface definition objects. For example, the systems 106 can generate interface definition objects from markup language code complying with a language specification. In various embodiments, the functionality of the interface definition systems 106 can be performed by one or more workstations, desktop computers, laptop computers, mobile devices (e.g., smartphone, cell phone, smartwatch, tablet computer, etc.), and the like. In a specific implementation, the interface definition systems 106 function to execute local and/or networked-based applications (e.g., web browsers, remote communication clients, software development platforms and environments, etc.).

In the example of FIG. 1, the communication network 108 may represent one or more computer networks (e.g., LAN, WAN, or the like) or other transmission mediums. The communication network 108 can provide communication between any of the multi-platform interface server system 102, the client systems 104, and the interface definition systems 106. In some embodiments, the communication network can provide communication between components of the systems 102-106. In some embodiments, the communication network 108 comprises one or more computing devices, routers, cables, buses, and/or other network topologies. In some embodiments, the communication network 108 may be wired and/or wireless. In various embodiments, the communication network 108 may comprise the Internet, one or more wide area networks (WANs) or local area networks (LANs), one or more networks that may be public, private, IP-based, non-IP based, and so forth. Communication networks and transmission mediums are discussed further herein.

Figure 2:
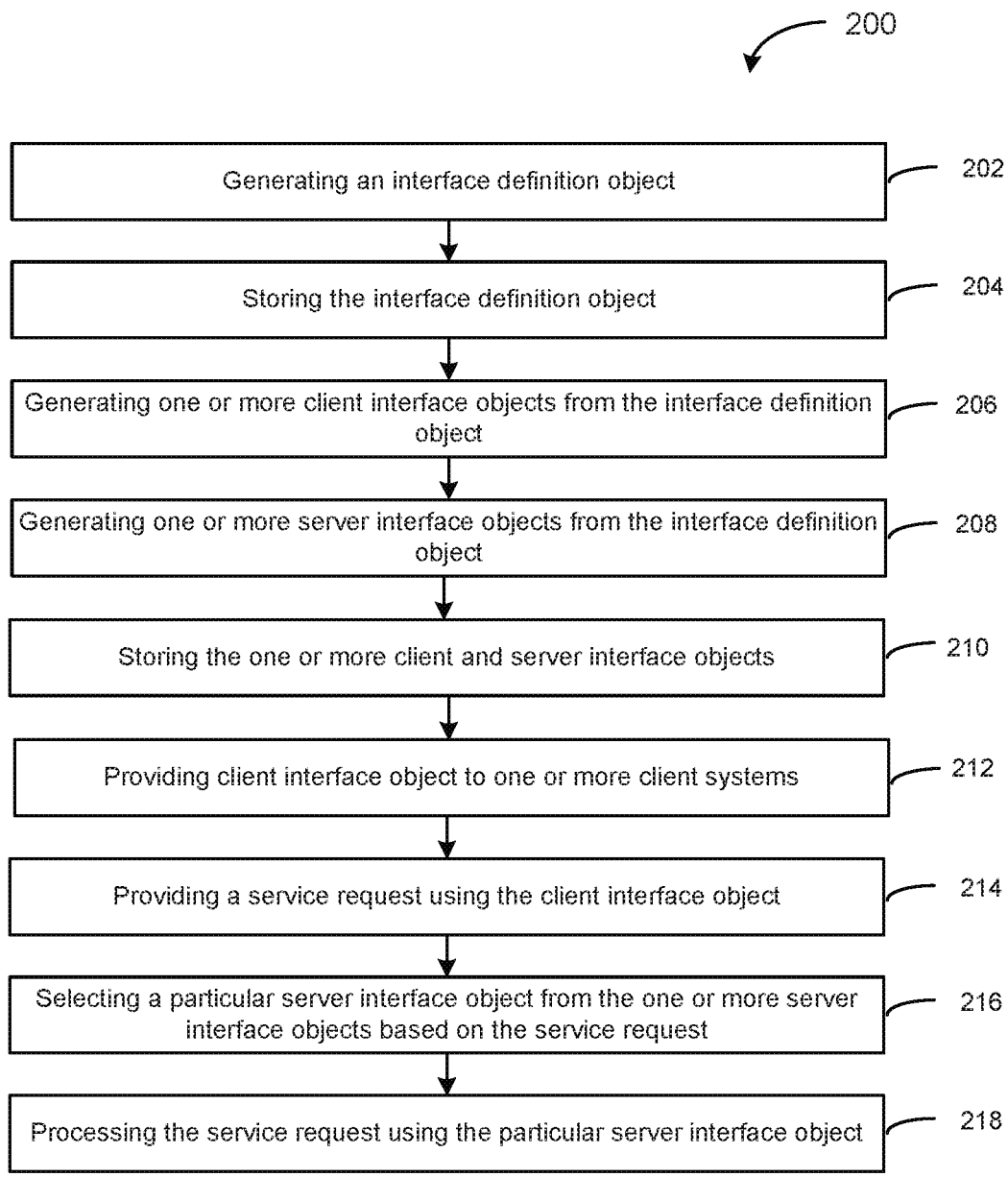
FIG. 2 depicts a flowchart of an example of a method for generating interface objects and responding to service requests according to some embodiments.

FIG. 2 depicts a flowchart 200 of an example of a method for generating interface objects and responding to service requests according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 202, an interface definition system generates an interface definition object. For example a user can define the interface definition object using an annotative language specification that is machine-readable, human-readable, and facilitates automatic rendering of interface documentation. In some embodiments, the annotative language specification can include a type system supporting imported types and defined types. Imported types can include types defined outside of the interface object definition and declared as explicit imports and given local names for use in the interface definition object. Defined types can be explicitly specified within the interface definition object. In some embodiments, imported types may be required to declare a defined fallback type, e.g., to support interoperability, otherwise the interface objects may only be generated for languages providing the import, which may limit interoperability. In various embodiments, one or more other systems can generate interface definition objects (e.g., client systems or multi-platform interface server systems) instead of, or in addition to, interface definition systems.

In some embodiments, the annotative language specification supports a variety of primitives, built-ins, and types. For example, the built-in can assist with mapping to existing language constructs (e.g., Java constructs) and simplify generation of interface objects. In some embodiments, the annotative language specification includes built-ins that support maps (e.g., a map of maps), lists, sets, and the like.

In step 204, a multi-platform interface server system stores the interface definition object. In some embodiments, the multi-platform interface server system receives the interface definition object from an interface definition system, and stores the interface definition object in a searchable format (e.g., an index).

In step 206, the multi-platform interface server system generates one or more client interface objects from the interface definition object. In some embodiments, the multi-platform interface server system generates multiple different client interface objects from the interface definition object. For example, some or all of the client interface objects can each be generated for a different platform.

In some embodiments, the multi-platform interface server system generates client safe enumerator type code for interface objects. Typically, enumerator types are not expansible. For example, in traditional systems, if an interface definition was created using a first enumerate value and second enumerate value, the client created from that interface definition could not handle additional enumerate value support. Since the multi-platform interface server system generates both the client interface objects and the server interface objects, the server (e.g., using server interface objects) can provide the necessary error checking functionality to support additional enumerator types that are added subsequent to initial generation of the client interface object. In some embodiments, client systems (e.g., using client interface objects) can provide the error checking functionality in addition to, or instead of, the server.

In step 208, the multi-platform interface server system generates one or more server interface objects from the interface definition object. In some embodiments, the multi-platform interface server system generates multiple different server interface objects from the interface definition object. For example, some or all of the server interface objects can be generated for a different platform.

In step 210, the multi-platform interface server system stores the client and server interface objects. In some embodiments, the multi-platform interface server system stores the interface objects in a searchable format.

In step 212, the multi-platform interface server system provides a client interface object to one or more client systems. In some embodiments, the client interface object can be provided in response to a request from a client system. For example, the client system can request a download of the client interface object. In some embodiments, the client interface object can be provided automatically by the multi-platform interface server system. For example, when a new version of the client interface object is generated, it can be pushed out to one or more associated client systems. In some embodiments, the multi-platform interface server system can track client systems that use a particular client interface object, and push out updates to those systems. In some embodiments, if a client systems registers with the multi-platform interface server system, the client systems can receive updates automatically. Registration can generate, for example, client system identifiers that can allow the multi-platform interface server system to identify the client systems to automatically receive updated client interface objects.

In step 214, a client system provides a service request using the client interface object to a server system. For example, the service request can be provided to the multi-platform interface server system, e.g., based on the client interface object, over a communication network. In another example, the service request can be provided to another server system identified by the client interface object. Accordingly, it will be appreciated that one or more other server systems instead of, or in addition to, the multi-platform server system can be configured to receive, process, and respond to, or otherwise handle, service requests using server interface objects.

In step 216, the multi-platform interface server system selects a particular server interface object from the stored server interface objects based on the service request. For example, a format of the service request, or the service request itself, can indicate a particular interface object, a particular interface object version, or a particular platform, some or all of which can be used to select the particular server interface object.

In step 218, the multi-platform interface server system processes the service request using the particular server interface object. In some embodiments, the multi-platform interface server system can generate a response object based on the platform(s) of the server interface object or client interface object used to generate the service request, and provide the response object to the requesting client system over the communications network. In step 220, the client system receives and processes the response object. In some embodiments, the client system receives and processes the response object using the client interface object.

Figure 3:
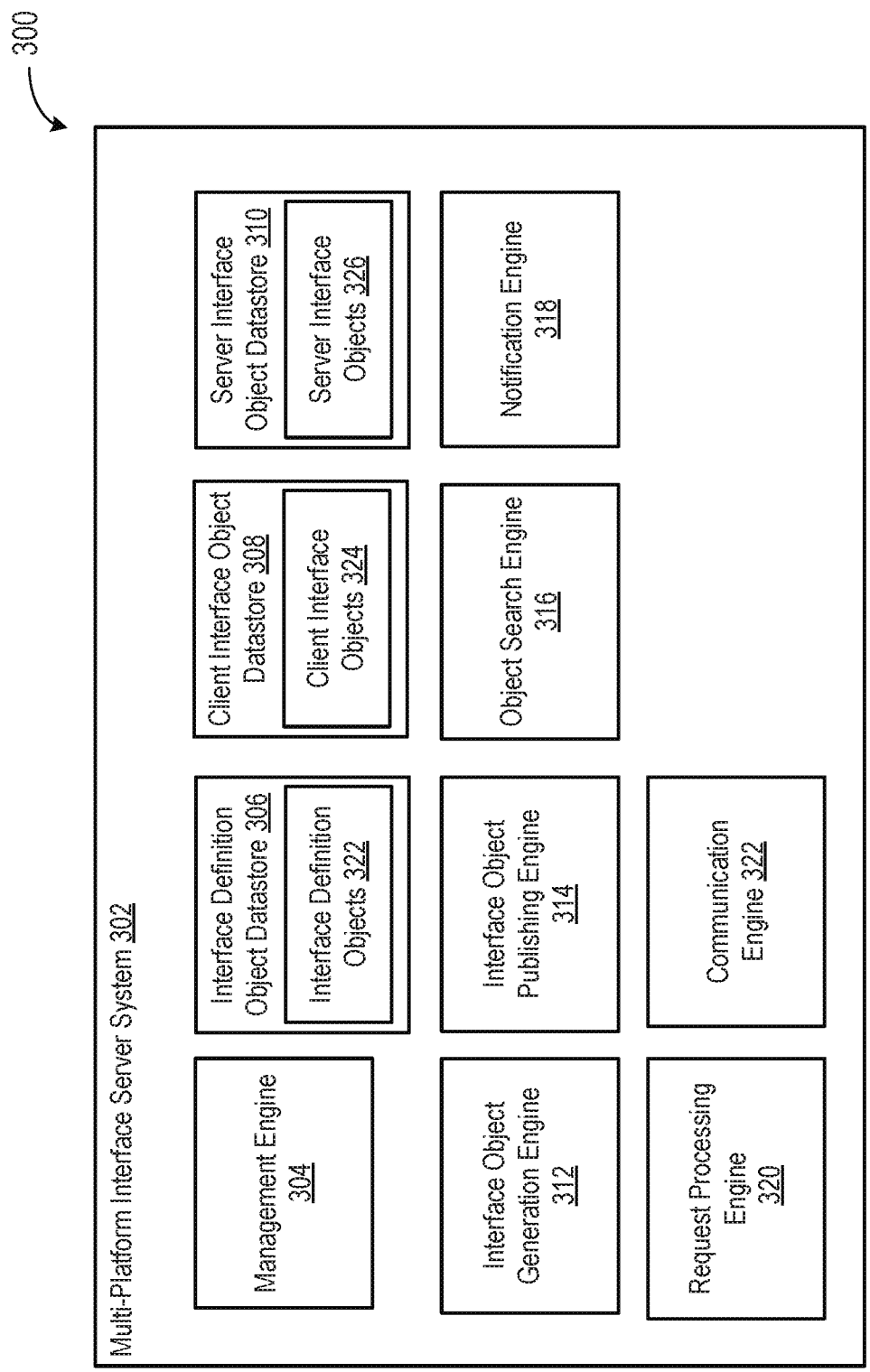
FIG. 3 depicts a diagram of an example of a multi-platform interface server system according to some embodiments.

FIG. 3 depicts a diagram 300 of an example of a multi-platform interface server system 302 according to some embodiments. In the example of FIG. 3, the multi-platform interface server system 302 includes a management engine 304, an interface definition object datastore 306, a client interface object datastore 308, a server interface object datastore 310, an interface object generation engine 312, an interface object publishing engine 314, an object search engine 316, a notification engine 318, a request processing engine 320, and a communication engine 322.

In the example of FIG. 3, the management engine 304 functions to manage (e.g., create, read, update, delete, or otherwise access) interface definition objects 324 stored in the interface definition object datastore 306, client interface objects 326 stored in the interface definition object datastore 308, and server interface objects 328 stored in the server interface object datastore 310. The management engine 310 can perform any of these operations manually (e.g., by a user interacting with a GUI), automatically (e.g., triggered by one or more of the engine 312-322, discussed below), or both. In some embodiments, the management engine 304 comprises a library of executable instructions which are executable by a processor for performing any of the aforementioned management operations. The datastores 306-310 may be any structure and/or structures suitable for storing the content objects 324-328. For example, the datastores 312-322, may comprise an index, a cache, a buffer, a relational database, an active database, a self-referential database, a table, a matrix, an array, a flat file, a non-relational No-SQL system, and the like.

In some embodiments, the interface definition objects 324 include of a variety of data, attributes, methods, and other parameters. In some embodiments, the interface definition objects 324 include platform and version information, in addition to an API specification. In some embodiments, the client interface objects 326 include code automatically generated from an interface definition object 324. For example, the client interface objects 326 can include Java source code that can allow a client system to communicate with server-side code (e.g., provided by a server interface content object 328). In some embodiments, the server interface content objects 328 include server-side code for processing service requests. For example, multiple server interface content objects 328 can be automatically generated from the same interface definition object 324.

In the example of FIG. 3, the interface object generation engine 310 functions to generate client interface objects 326 and server interface objects 328. For example, the interface object generation engine 310 can function to generate multiple client interface objects 326 and server interface objects 328 from the same interface definition object 324. In some embodiments, the interface object publishing engine 314 comprises separate code generators for the different platforms, although some embodiments comprise a unified code generator that can generate code for different platforms. For example, a unified code generator may utilize plugins for the various different platforms, rather than separate code generators.

In some embodiments, the interface object generation engine 310 comprises a parser and a lexer, e.g., a YAML parser and lexer, albeit as adapted to provide the functionality described herein. In various embodiments, the interface object generation engine 310 comprises a parser combinator that can be configured to simultaneously perform parser and lexer functions (e.g., token generation is not separated from token interpretation). For example, the parser combinator can interpret tokens and use the token interpretation to inform parser progress.

In the example of FIG. 3, the interface object publishing engine 314 functions to publish client interface objects 326 and server interface objects 328 to one or more local or remote systems. For example, the interface object publishing engine 314 can automatically publish the objects 326 and 328 to an index or other searchable structure once the objects are generated. In some embodiments, the interface object publishing engine 314 can be configured to automatically publish client interface objects 324 to one or more client systems. This can, for example, ensure the client systems have the most up to date version of a client interface object 326.

In some embodiments, the interface object publishing engine 314 can be configured to automatically publish client interface objects 326 and server interface objects 328 in response to one or more trigger events. This can, for example, ensure the most recent versions of the objects 324 and 326 are made available, without requiring a user (e.g., an original producer of an interface object) to manually maintain the objects 326 and 328. In some embodiments, the trigger events can include an upgrade to the interface object generation engine 312, or component thereof (e.g., lexer or parser), or when support for an additional platform is added (e.g., adding support for Golang in addition to Java and Python). Additional trigger events can include modification to an interface definition object 324 (e.g., updated to a current version), or generation of interface objects 326 or 328 (e.g., updated to a current version). For example, rather than requiring a user to manually code or generate interface objects, which can result in inconsistent interface objects, the interface object publishing engine 314 can automatically publish interface objects 326 and 328 for some or all supported platforms when a corresponding interface definition object 324 is modified.

In some embodiments, the interface object publishing engine 314 is configured to render interface object documentation from one or more objects 324-328. For example, the interface object publishing engine 314 can render documentation directly from an interface definition object because the language specification associated with the interface definition object 324 is human readable. In some embodiments, the interface object publishing engine 314 can automatically render documentation that includes sample code. For example, the sample code can be rendered from one or more methods included or referenced in the interface definition object 324, client interface object 326, or server interface object 326. In some embodiments, some or all of the objects 324-328 can include tags, or other indicators, to indicate features (e.g., methods) to include in interface documentation. For example, the interface object publishing engine 314 can generate sample code from tagged methods.

In the example of FIG. 3, the object search engine 316 provides functionality for searching interface definition objects 324, client interface objects 326 and server interface objects 328. In some embodiments, the object search engine 316 can be triggered manually. For example, a user can search for particular objects 324-328 based on platform or other attributes (e.g., a particular method, interface name, or other identifier of an object 324-328, or the like). In some embodiments, the object search engine 316 can be triggered automatically, e.g., in response to a service request. For example, the object search engine 316 can identify and select an appropriate server interface object 328 based on a client interface object 326 used to generate the service request. In some embodiments, the object search engine 316 can identify and select an appropriate server interface object 328 based on a format of the service request.

In some embodiments, the object search engine 316 facilitates versioning capabilities for the objects 324-328. As discussed elsewhere in this paper, the system 302 can generate and store different versions of the objects 324-328. For example, as new objects 324-328 are generated or obtained, the system 302 can add the new objects 324-328, along with version information (or, version metadata), to a datastore of searchable objects 324-328. In some embodiments, when a service request is received, the object search engine 316 can automatically identify an interface object version associated with the service request, and select a corresponding server interface object 328. For example, if a service request is generated using a client interface object 326 having a version "1.0," the object search engine 316 can identify and select a compatible server interface object 328. In some embodiments, a compatible server interface object 328 can be determined based on compatible or matching version information. This can allow, for example, a legacy client interface object to interact with a server system even after new versions of the interface objects have been released.

In the example of FIG. 3, the notification engine 318 functions to generate notification messages. In some embodiments, the notification engine 318 generates notification manually, e.g., by a user interacting with a GUI, or automatically, e.g., in response to one or more trigger events. For example, trigger events can include generation of interface objects 326 or 328, or other trigger events as described herein. In some embodiments, the notification messages can facilitate upgrading interface objects 326 or 328. For example, the notification message can include a link to obtain an updated client interface object 326 or updated server interface object 328.

In the example of FIG. 3, the request processing engine 320 functions to handle (e.g., receive and respond to) service requests. For example, the request processing engine 320 can execute one or more server interface objects 328 to handle service requests. In some embodiments, the request processing engine 320 can select one or more appropriate server interface objects 328 to handle the service request based on the service request. For example, the request processing engine 320 can parse the service request and identify a service, platform and interface object version associated with the service request. In some embodiments, the request processing engine 320 can select one or more server interface objects 328 identified by the object search engine 316 in response to a trigger from the request processing engine 320. In some embodiments, the request processing engine 320 can generate response objects using the selected server interface object 328.

The communication engine 322 functions to send requests, transmit and, receive communications, and/or otherwise provide communication with one or a plurality of systems. In some embodiments, the communication engine 322 functions to encrypt and decrypt communications. The communication engine 322 may function send requests to and receive data from a system through a network or a portion of a network. Depending upon implementation-specific or other considerations, the communication engine 322 may send requests and receive data through a connection, all or a portion of which may be a wireless connection. The communication engine 322 may request and receive messages, and/or other communications from associated systems.

Figure 4:
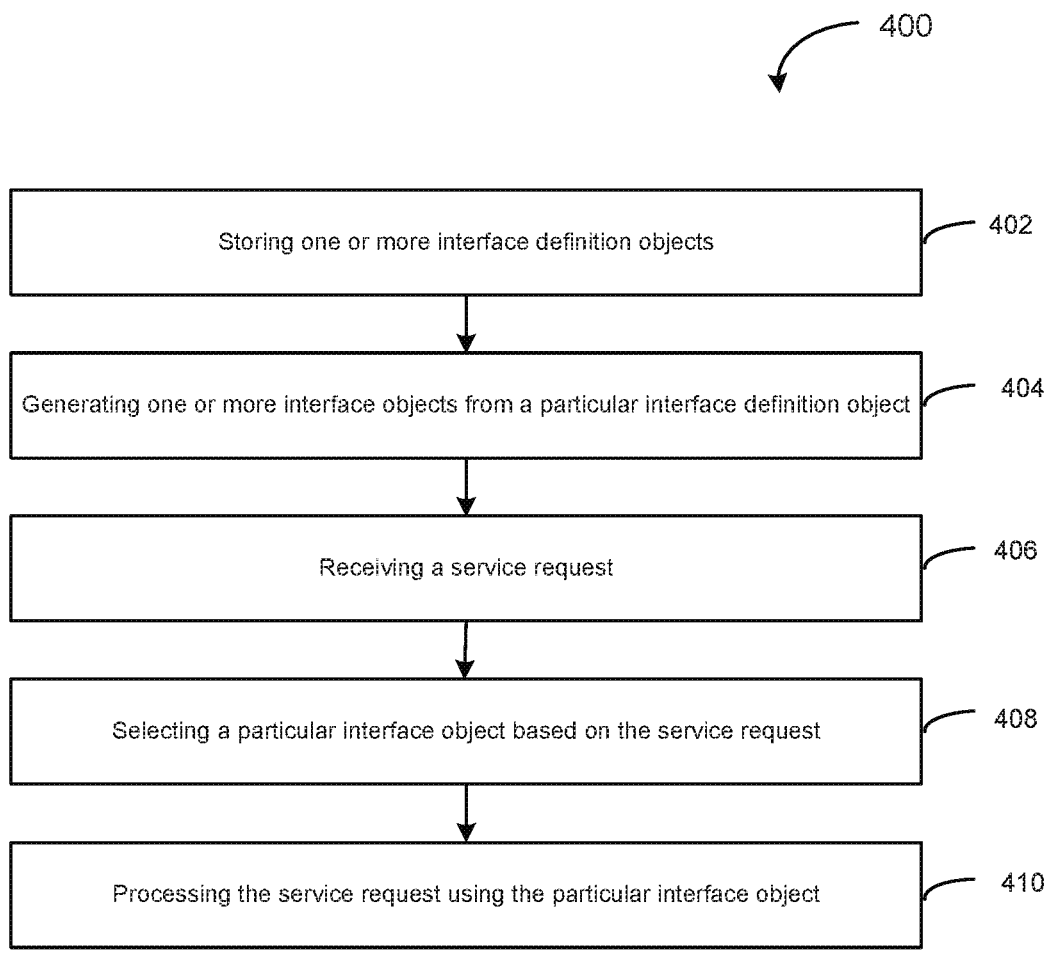
FIG. 4 depicts a flowchart of an example of a method of operation of a multi-platform interface server system for generating interface objects and responding to service requests according to some embodiments.

FIG. 4 depicts a flowchart 400 of an example of a method of operation of a multi-platform interface server system for generating interface objects and responding to service requests according to some embodiments.

In step 402, a multi-platform interface server system stores one or more interface definition objects. In some embodiments, a management engine and/or publishing engine store the objects in a searchable format in an interface definition object datastore.

In step 404, the multi-platform interface server system generates one or more interface objects. In some embodiments, the one or more interface objects include one or more client interface objects. In some embodiments, the multi-platform interface server system generates multiple different interface objects from a same (e.g., single) interface definition object. In some embodiments, the multi-platform interface server system embeds an identifier object within the interface objects. For example, the identifier object can indicate a unique identifier of the interface object, a version of an engine used to generate the interface object, one or more platforms associated with the interface object, an interface object generation date, or one or more related interface objects or interface definition objects. The identifier object can facilitate identification of corresponding interface objects and searching of interface objects. In some embodiments, an interface object generation engine performs the interface object generation and embedding of identification objects.

In step 406, the multi-platform interface server system receives a service request. In some embodiments, a request processing engine receives the request over a communication network from a client system. For example, the service request may have been generated using a client interface object. In some embodiments a request processing engine receives the service request.

In step 408, the multi-platform interface server system selects a particular interface object from the one or more interface objects based on the service request. For example, the multi-platform interface server system can select a server interface object corresponding to a client interface object used to generate the service request. In some embodiments, the multi-platform interface server system can parse the interface object to determine the selected server interface object based on a format of the service request. The format can include for example, platform information, interface object version information, and identifier object information. In some embodiments an object search engine identifies and selects the particular interface object (e.g., in response to a trigger from the request processing engine).

In step 410, the multi-platform interface server system processes the service request using the particular interface object. For example, the multi-platform interface server system can use a particular server interface object to process the server request and return a response object to the requesting client system. In some embodiments, a request processing engine processes the service request.

Figure 5:
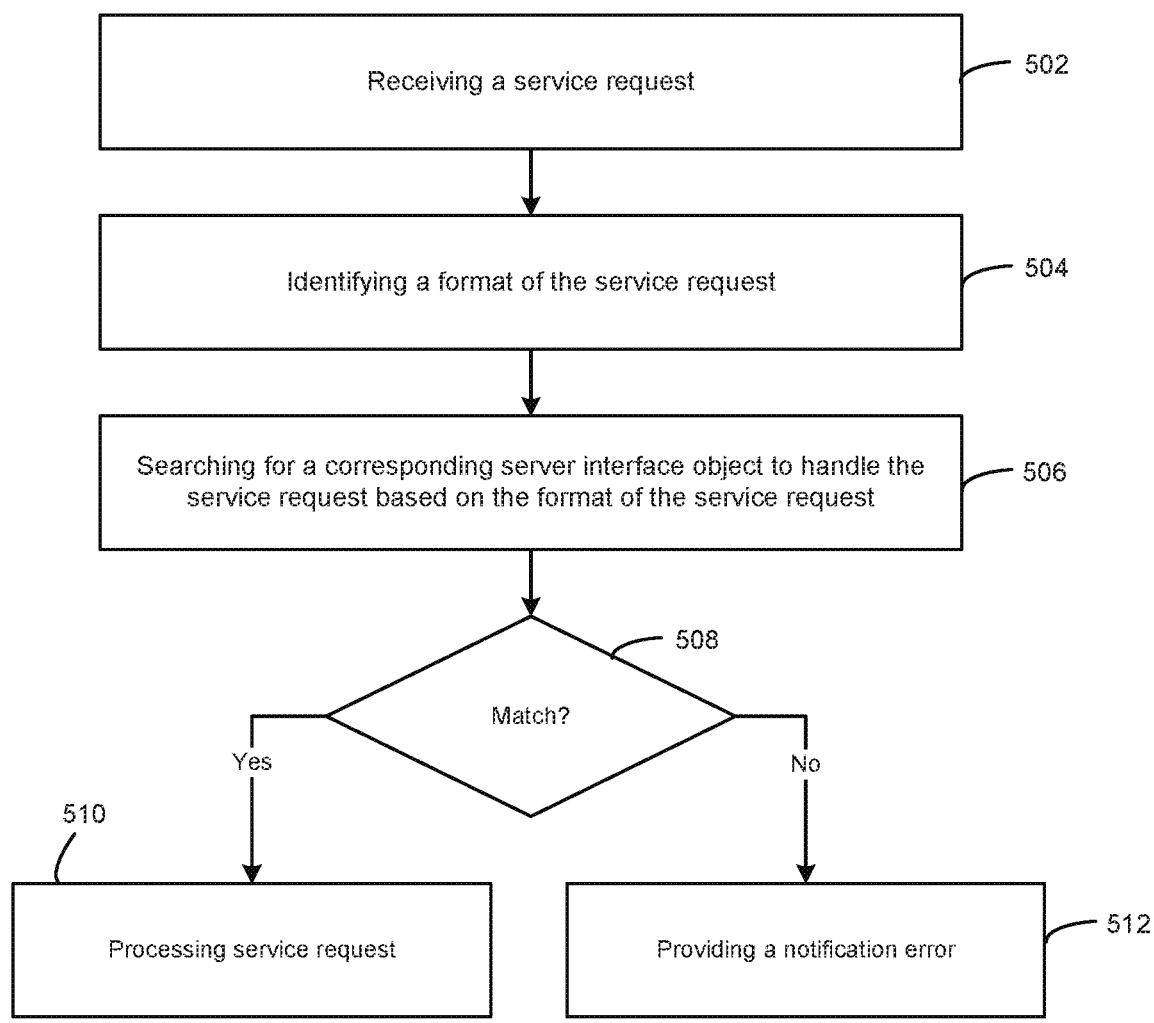
FIG. 5 depicts a flowchart of an example of a method of operation of a multi-platform interface server system for generating interface objects and responding to service requests according to some embodiments.

FIG. 5 depicts a flowchart of an example of a method of operation of a multi-platform interface server system for generating interface objects and responding to service requests according to some embodiments.

In step 502, a multi-platform interface server system receives a service request using a server interface object. The server interface object can be generated using a corresponding client interface object. In step 504, the multi-platform interface server system identifies a format of the request. In step 506, the multi-platform interface server system searches for a corresponding server interface object based on the format of the service request. In step 508, the multi-platform interface server system determines whether there is a corresponding server interface object. In step 510, the multi-platform interface server system, if there is a corresponding server interface object, selects that interface object and processes the service request. In step 512, the multi-platform interface server system, if there is no corresponding interface object, generates and returns an error notification. In some embodiments, a notification engine generates and returns the error notification.

Figure 6:
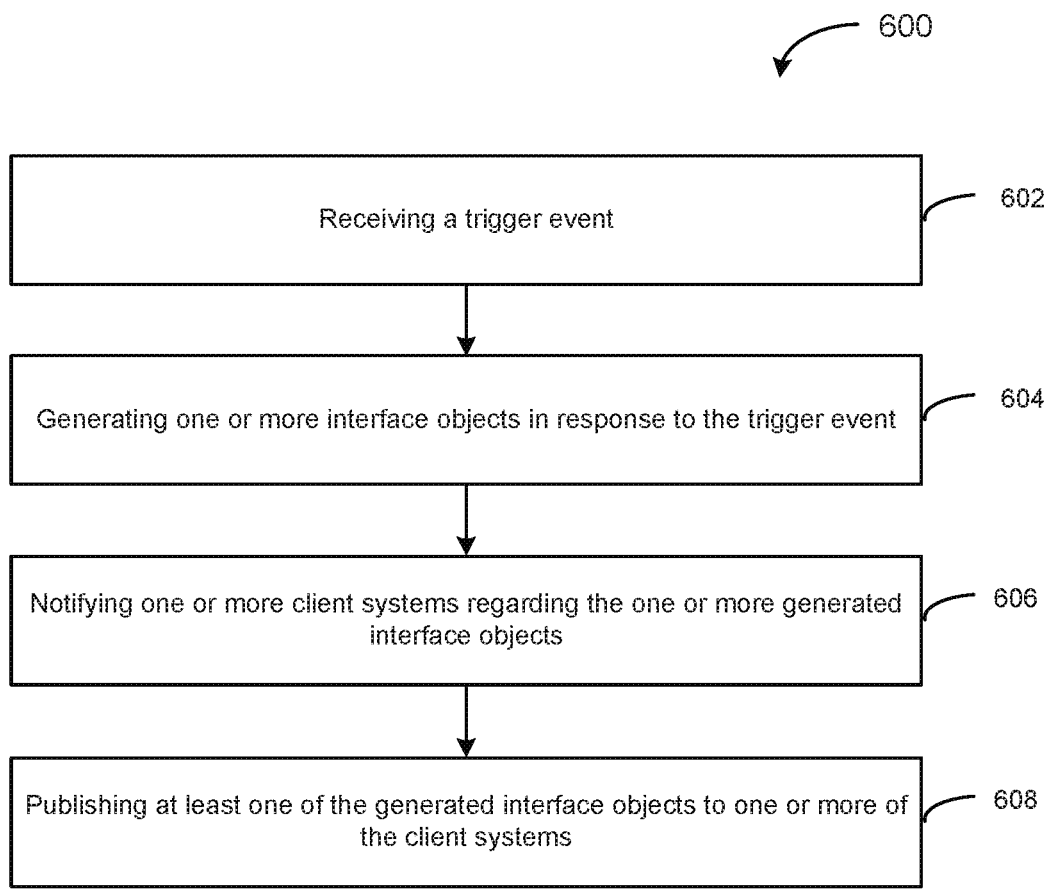
FIG. 6 depicts a flowchart of an example of a method of operation of a multi-platform interface server system for publishing interface objects.

FIG. 6 depicts a flowchart of an example of a method of operation of a multi-platform interface server system for publishing interface objects.

In step 602, a multi-platform interface server system receives a trigger event. In step 604, the multi-platform interface server system generates one or more interface objects in response to the trigger event. In step 606, the multi-platform interface server system notifies one or more associated client systems regarding the generated interface objects. For example, if the interface objects were generated in response to an updated version of the corresponding interface definition object, the multi-platform interface server system can notify the associated client systems (e.g., the client systems having a legacy version of the client interface object) of the update. In some embodiments, a notification engine provides the notification. In step 608, the multi-platform interface server system publishes the generated interface objects to the associated client systems. In some embodiments, a publishing engine automatically publishes the generated interface objects.

Hardware Implementation

Figure 7:
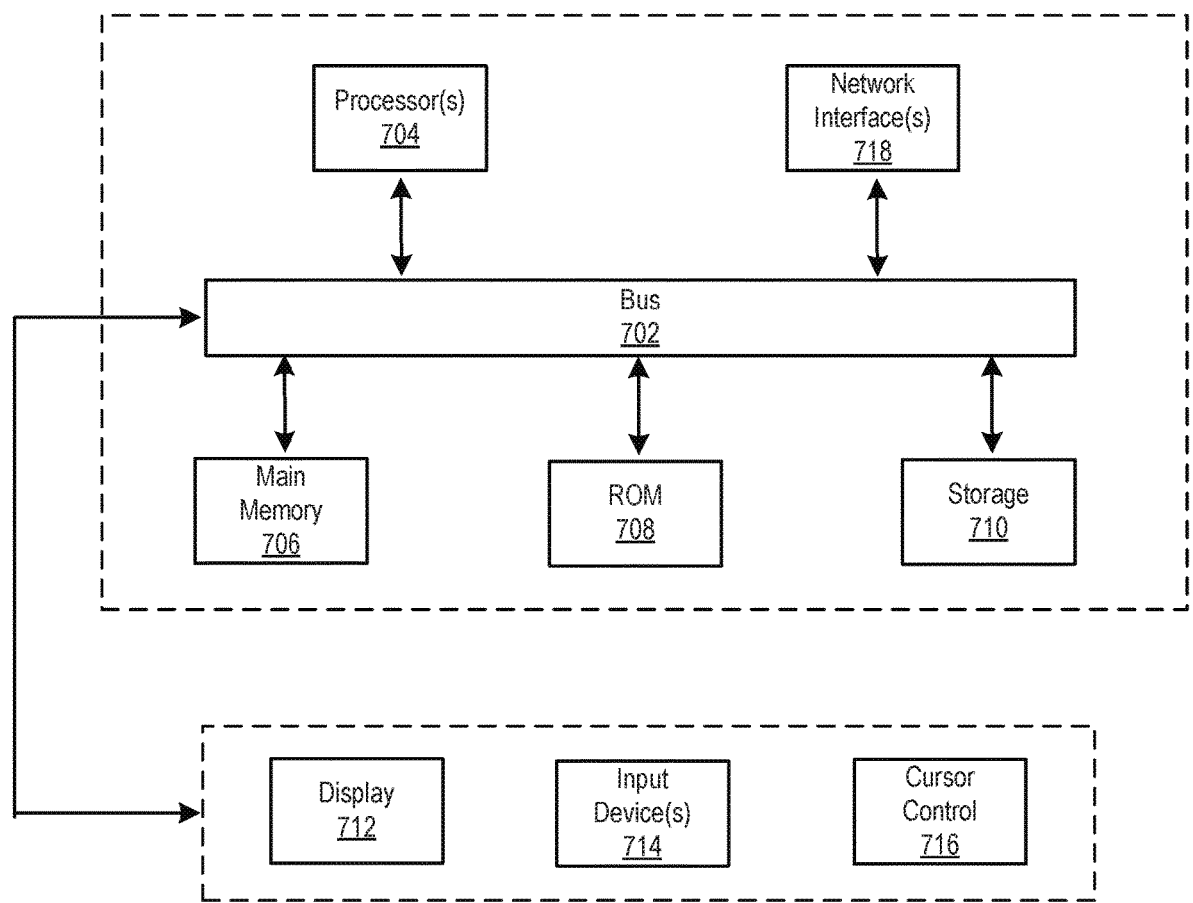
FIG. 7 depicts a block diagram of an example of a computer system upon which any of the embodiments described herein may be implemented.

FIG. 7 depicts a block diagram of an example of a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
   one or more processors; and
   memory storing instructions that, when executed by the one or more processors, cause the system to perform:
   generating one or more first interface objects for facilitating remote interaction between a plurality of client systems and a server system over a communication network, the one or more first interface objects generated from a same interface definition object;
   triggering generation of one or more second interface objects in response to a trigger event;
   receiving a service request from a particular client system of the plurality of client systems over the communication network;
   selecting a particular interface object from the one or more second interface objects based on the service request;
   processing the service request using the particular interface object;
   identifying one or more second client systems of the plurality of client systems associated with at least one of the one or more first interface objects;
   notifying the one or more second client systems regarding the one or more second interface objects; and
   publishing at least one of the one or more second interface objects to at least one of the one or more second client systems in response to the trigger event.

2. The system of claim 1, wherein the one or more interface objects comprise one or more application programming interfaces (APIs).

3. The system of claim 1, wherein the trigger event comprises receiving a second interface definition object, the second interface definition object being an updated version of the interface definition object.

4. The system of claim 3, wherein the one or more second interface objects are generated from the second interface definition object in response to the trigger event.

5. The system of claim 1, wherein the instructions further cause the system to perform:
   receiving a second service request from a second client system of the plurality of client systems over the communication network;
   selecting a second particular interface object from the one or more second interface objects, the selecting based on the second service request; and
   processing the second service request using the second particular interface object.

6. The system of claim 5, wherein the trigger event comprises receiving a second interface definition object, the second interface definition object being a different version of the interface definition object.

7. The system of claim 6, wherein the one or more second interface objects are generated from the second interface definition object in response to the trigger event.

8. A method being implemented by a computing system including one or more physical processors and storage media storing machine-readable instructions, the method comprising:
   generating one or more first interface objects for facilitating remote interaction between a plurality of client systems and a server system over a communication network, the one or more first interface objects generated from a same interface definition object;
   triggering generation of one or more second interface objects in response to a trigger event;
   receiving a service request from a particular client system of the plurality of client systems over the communication network;

selecting a particular interface object from the one or more second interface objects based on the service request;

processing the service request using the particular interface object;

identifying one or more second client systems of the plurality of client systems associated with at least one of the one or more first interface objects;

notifying the one or more second client systems regarding the one or more second interface objects; and publishing at least one of the one or more second interface objects to at least one of the one or more second client systems in response to the trigger event.

9. The method of claim 8, wherein the one or more interface objects comprise one or more application programming interfaces (APIs).

10. The method of claim 8, further comprising:

identifying one or more second client systems of the plurality of client systems associated with at least one of the one or more first interface objects; and notifying the one or more second client systems regarding the one or more second interface objects.

11. The method of claim 10, further comprising:

publishing at least one of the one or more second interface objects to at least one of the one or more second client systems in response to the trigger event.

12. The method of claim 8, wherein the trigger event comprises receiving a second interface definition object, the second interface definition object being an updated version of the interface definition object.

13. The method of claim 12, wherein the one or more second interface objects are generated from the second interface definition object in response to the trigger event.

14. The method of claim 8, further comprising:

receiving a second service request from a second client system of the plurality of client systems over the communication network;

selecting a second particular interface object from the one or more second interface objects, the selecting based on the second service request; and processing the second service request using the second particular interface object.

15. The method of claim 14, wherein the trigger event comprises receiving a second interface definition object, the second interface definition object being a different version of the interface definition object.

16. The method of claim 15, wherein the one or more second interface objects are generated from the second interface definition object in response to the trigger event.

17. A non-transitory computer readable medium comprising instructions that, when executed, cause one or more processors to perform:

generating one or more first interface objects for facilitating remote interaction between a plurality of client systems and a server system over a communication network, the one or more first interface objects generated from a same interface definition object;

triggering generation of one or more second interface objects in response to a trigger event;

receiving a service request from a particular client system of the plurality of client systems over the communication network;

selecting a particular interface object from the one or more second interface objects based on the service request;

processing the service request using the particular interface object;

identifying one or more second client systems of the plurality of client systems associated with at least one of the one or more first interface objects;

notifying the one or more second client systems regarding the one or more second interface objects; and publishing at least one of the one or more second interface objects to at least one of the one or more second client systems in response to the trigger event.

\* \* \* \* \*